United States Patent [19]

Hashimoto et al.

[11] 4,046,987

[45] Sept. 6, 1977

[54] DC ARC WELDING APPARATUS USING HIGH-FREQUENCY PULSE CURRENT

[75] Inventors: Shinichiro Hashimoto; Toru Goto; Yukio Kajino, all of Nagoya, Japan

[73] Assignee: Mitsubishi Denki Kabushiki Kaisha, Tokyo, Japan

[21] Appl. No.: 662,876

[22] Filed: Mar. 1, 1976

[30] Foreign Application Priority Data

Mar. 10, 1975 Japan .................................. 50-28788

[51] Int. Cl.² .............................................. B23K 9/10
[52] U.S. Cl. ................................ 219/135; 219/131 R
[58] Field of Search ............ 219/135, 131 R, 131 WR, 219/131 F; 307/108

[56] References Cited

U.S. PATENT DOCUMENTS

| | | | |
|---|---|---|---|
| 3,249,735 | 5/1966 | Needham | 219/131 R |
| 3,382,345 | 5/1968 | Normando | 219/135 |
| 3,459,996 | 8/1969 | Adamson | 219/135 |
| 3,588,465 | 6/1971 | Anderson et al. | 219/131 R |
| 3,775,585 | 11/1973 | Okada | 219/135 |
| 3,777,176 | 12/1973 | Praeg | 307/108 |
| 3,902,037 | 8/1975 | Goto et al. | 219/135 |
| 3,906,289 | 9/1975 | Lepp et al. | 219/131 R |
| 3,944,780 | 3/1976 | Paton et al. | 219/135 |

*Primary Examiner*—J. V. Truhe
*Assistant Examiner*—Clifford C. Shaw
*Attorney, Agent, or Firm*—Oblon, Fisher, Spivak, McClelland & Maier

[57] ABSTRACT

A DC arc welding apparatus using a high-frequency pulse current is disclosed and includes a rectifier bridge for commutating AC voltage and for applying DC voltage having a substantially smooth waveform to a circuit including an electrode and a workpiece for welding. A first switch is connected between an arc load formed between the electrode and the workpiece and a positive output side of the rectifier bridge. A second switch is connected between the arc load and a negative output side of the rectifier bridge. A capacitor has one end connected to a contact of the rectifier bridge and the first switch and another end connected to a contact of the rectifier bridge and the second switch. First and second rectifiers are connected so as to charge energy accumulated in the inductance of the circuit including the electrode and the workpiece during the off state of the first and second switches to the capacitor so that the current passed through the arc load is controlled by an on-off control of the first and second switches.

8 Claims, 15 Drawing Figures

FIG. 3
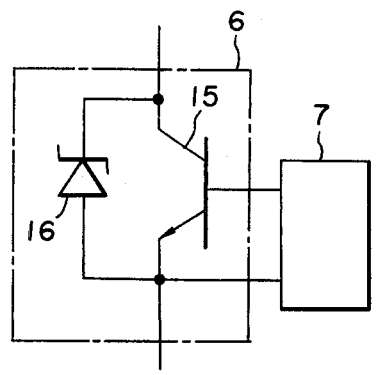
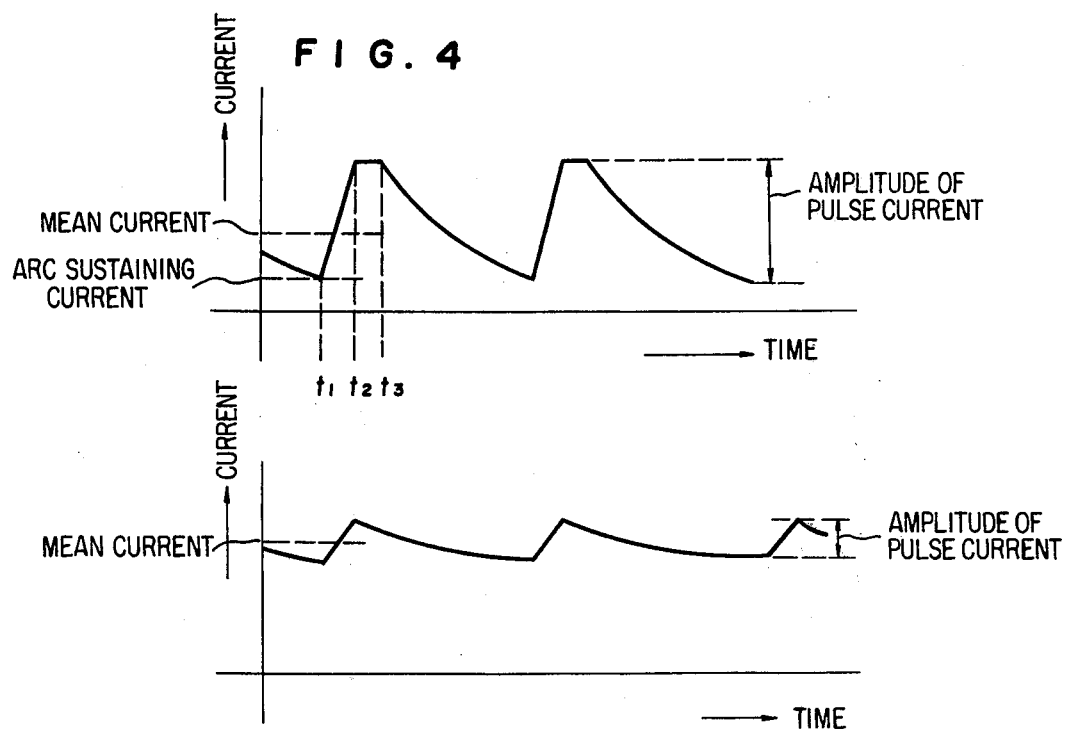
FIG. 5

DC ARC WELDING APPARATUS USING HIGH-FREQUENCY PULSE CURRENT

BACKGROUND OF THE INVENTION

1. Field of the Invention

The present invention relates to a DC arc welding apparatus using high-frequency pulse current, especially higher than 1 KHz.

2. Description of the Prior Art

In general, it has been known what when the Tungsten Inert Gas welding method or the Metal Inert Gas welding method is carried out by using a high-frequency pule current having higher than 1 KHz as shown in FIG. 1, desirable effects of improvements of an arc stability, a quality of welded product and a welding operation efficiency can be attained in comparison with the case of an application of DC current or pulse current having frequency of less than 1 KHz.

The improved welding effect by the high-frequency pulse current is remarkable depending upon increase of amplitude of the pulse current in the same mean current.

Heretofore, it has been proposed to employ an apparatus shown in FIG. 2 in order to feed the pulse current to the welding part.

However, the conventional apparatus has disadvantages that enough pulse current can not be fed and the power loss in the apparatus is high.

This problem is illustrated with particular reference to FIG. 2 which shows a conventional apparatus.

In FIG. 2, the reference numeral 1 designates a single-phase or three-phase AC power source to supply the power to a main part of the welding apparatus 2 which comprises a main transformer 3, a current limiting reactor 4, a rectifier bridge 5, a switching element 6, a controlling device 7 for the switching element, a rectifier 8, an auxiliary transformer 9, an auxiliary reactor 10 and an auxiliary rectifier bridge 11.

The connections of the power source 1, the main transformer 3, the current limiting reactor 4 and the rectifier bridge 5 and the connections of the auxiliary transformer 9, the auxiliary reactor 10 and the auxiliary bridge 11 are usually connected with two or three cables, though the connection in FIG. 2 is simplified.

A cable 12 connects an output terminal of the main part of the welding apparatus 2 to a welding torch 13 and a workpiece for welding 14 so as to feed the welding current from the main part of the welding apparatus 2 to the arc generating part.

The conventional welding apparatus shown in FIG. 2 operates as follows. When the switching element 6 is turned on and off in the frequency having higher than 1 KHz, under the command of the controlling device 7, the output of the rectifier bridge 5 is short-circuited by turning on the switching element 6, whereby the constant current which is given by the output voltage of the main transformer 3 and the impedance of the current limiting reactor 4 is passed through the switching element 6.

When the switching element 6 is turned off, the constant current is passed through the rectifier 8, the cable 12, the workpiece 14, the welding torch 13, and the cable 12.

As the result, the pulse current is passed between the cable 12 and the arc generating part by turning on and off the switching element 6.

The circuit of the auxiliary transformer 9, the auxiliary reactor 10, the auxiliary bridge 11 feeds the arc sustaining current having quite small value which is given by the output current of the auxiliary transformer 9 and the impedance of the auxiliary reactor 10, the arc generating part by the output of the auxiliary rectifier bridge 11. Accordingly, when the pulse current in the arc generating part is not fed by turning on the switching element 6 in accordance with said operation, arc between the welding torch 13 and the workpiece 14 is sustained. The rectifier 8 prevents the passage of the output current of the auxiliary rectifier bridge 11 through the switching element 6 when the switching element 6 is turned on.

From the description of the operation, it is understood that the welding current of FIG. 1 is fed through the cable wire 12, the welding torch 13, the workpiece 14 of the conventional apparatus of FIG. 2. In FIG. 2, the switching element 6 is shown as a mechanical contact. In practical circuit, a semiconductor switching element having similar function is used for repeating switch in high-frequency of higher than 1 KHz.

When a transistor is used as the switching element 6, the structure of FIG. 3 can be considered for the switching element 6 and the controlling device 7.

In FIG. 3, the switching element 6 comprises a transistor for switching 15 and the constant-voltage diode 16 connected in parallel to the transistor. The transistor 15 is switched by the signal current fed from the controlling device 7 to the base of the transistor.

The operation of the constant-voltage diode 16 will be stated later. In general, the length of the cable 12 in FIG. 2 can be in a range of several meters to several tens meters in the circumstance of the place for welding operation. In the welding cable, an inductance of about $1\mu$ per 1 m is always given. Accordingly, the pulse current having frequency of higher than several KHz is not given as shown in FIG. 1, but is given as shown in FIG. 4.

The disadvantages of the apparatus of FIGS. 2 and 3 are mainly caused by the inductance of the cable 12.

The disadvantages will be discussed referring to FIG. 4. In the conventional apparatus of FIGS. 2 and 3, the output current $I_1$ of the rectifier bridge 5 is constant regardless the switching operation of the switching element 6 because of extremely high impedance of the current limiting reactor 4. The following equation is given.

$$I_2 + I_3 = I_1 \text{ (constant)} \tag{1}$$

wherein $I_2$ designates a current passed through the switching element 6 and $I_3$ designates a welding current passed through the arc generating part. When the switching element 6 is turned off at the time $t_1$ in FIG. 4; that is to stop the signal from the controlling device 7 to the transistor 15, the welding current $I_3$ does not increase suddenly as shown in FIG. 1 but it increases gradually as shown in FIG. 4 after the time $t_1$ because of inductance of the cable 12. Accordingly, the current $I_2$ passing through the switching element 6 cannot be zero immediately after the time $t_1$ as shown by the equation 1.

However, the transistor 15 of FIG. 3 as a switching element 6 is in the OFF state after the time $t_1$, whereby the current $I_2$ is attenuated under passing through the constant-voltage diode 16 and becomes zero at the time $t_2$ when the current $I_3$ reaches to $I_1$.

The welding current $I_3$ sustains the constant value $I_1$ until the time $t_3$. When the switching element 6 is turned on at the time $t_3$, the current $I_3$ does not immediately decrease to zero and is attenuated under a time constant given by the inductance and the resistances of the circuit and the arc voltage under passing through the circular circuit of the switching element 6, the diode 8, the cable 12, the workpiece 14, the welding torch 13, the cable 12 and the switching element 6.

However, the resistance in the circular circuit is usually low, whereby the time constant of the attenuation is usually same or longer than the frequency of the pulse current.

Accordingly, the waveform of the welding current $I_3$ is given by FIG. 4 in the case of relatively short cable 12 and low inductance:

However, if the inductance is high or the frequency of the switching element 6 is high, the next pulse period is started before enough attenuation of the current $I_3$ so as to turn off the switching element 6. Accordingly, the waveform having small amplitude of the pulse current as shown in FIG. 5 is given and the effect of the pulse current cannot be substantially expected.

The loss caused by the current $I_2$ passed through the constant-voltage diode 16 of FIG. 3 during the period $t_1$ to $t_2$, increases depending upon the increase of the inductance of the cable 12 to remarkably decrease efficiency of the apparatus.

SUMMARY OF THE INVENTION

It is an object of the present invention to provide a DC arc welding apparatus using high-frequency pulse current which has improvements of an arc stability, a quality of welded product and a welding operation efficiency.

The object of the invention can be attained by providing a DC arc welding apparatus using high-frequency pulse current which comprises a rectifier bridge for commutating AC voltage to apply the DC voltage having substantially smooth waveform to a circuit including an electrode and a workpiece for welding; a first switch connected between an arc load formed between the electrode and the workpiece and the positive output side of the rectifier bridge; a second switch connected between the arc load and the negative output side of the rectifier bridge; a capacitor one end of which is connected to a contact of the rectifier bridge and the first switch and the other end of which is connected to a contact of the rectifier bridge and the second switch; and first and second rectifiers which are connected so as to charge energy accumulated in the inductance of the circuit including the electrode and the workpiece during the OFF state of the first and second switches, to the capacitor whereby the current passed through the arc load is controlled by the ON-OFF control of the first and second switches to attain the improvement of an arc stability, a quality of welded product and an efficiency of welding operation.

In one embodiment of the DC arc welding apparatus using high-frequency pulses, a controlling device which detects through a shunt instantaneous values of the welding current passed through the arc load is provided whereby the first and second switches are turned on and off under control by the output signal of the controlling device and when the instantaneous value detected is higher than a predetermined value, the controlling device is stopped to turn off the first and second switches so as to prevent a trouble of the apparatus.

In one embodiment of the DC arc welding apparatus, a resistance, an inductance or a circuit of resistance and inductance is connected in parallel to each of the first and second switches whereby the arc sustaining current is fed during the OFF state of the switches so as not to need a special power source.

In one embodiment of the DC arc welding apparatus, it has coupling coils wherein a primary winding of the coupling coils is connected to a high frequency generator and a secondary winding is connected in series to the arc load whereby the high-frequency generator is actuated only when the arc load is started, and the inductance of the secondary winding of the coupling coils can be varied in the normal state so as to balance the inductances of the apparatus.

In one embodiment of the DC arc welding apparatus, a controlling apparatus is used for detecting two instantaneous values of the welding current and generating switching command signal for feeding the welding current to reciprocate between said two instantaneous values for plural times, whereby the welding current having the predetermined mean value is fed to the arc generating part even though the inductance of the cable is low or the repeating frequency of the pulse is relatively low.

BRIEF DESCRIPTION OF THE DRAWINGS

FIG. 3 is a diagram of a switching element of the conventional apparatus of FIG. 2;

FIG. 4 shows one of the output current waveforms of the conventional apparatus of FIG. 2;

FIG. 5 shows the other example of the output current waveform of the apparatus of FIG. 2;

In the drawings, like references designate identical or corresponding parts.

DETAILED DESCRIPTION OF THE PREFERRED EMBODIMENTS

Figure 1:
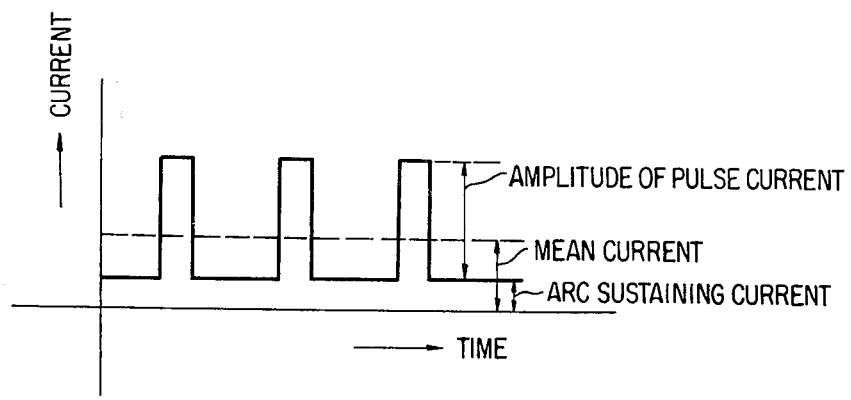
FIG. 1 shows an ideal current waveform of a conventional DC arc welding apparatus using high-frequency pulse current.
Figure 2:
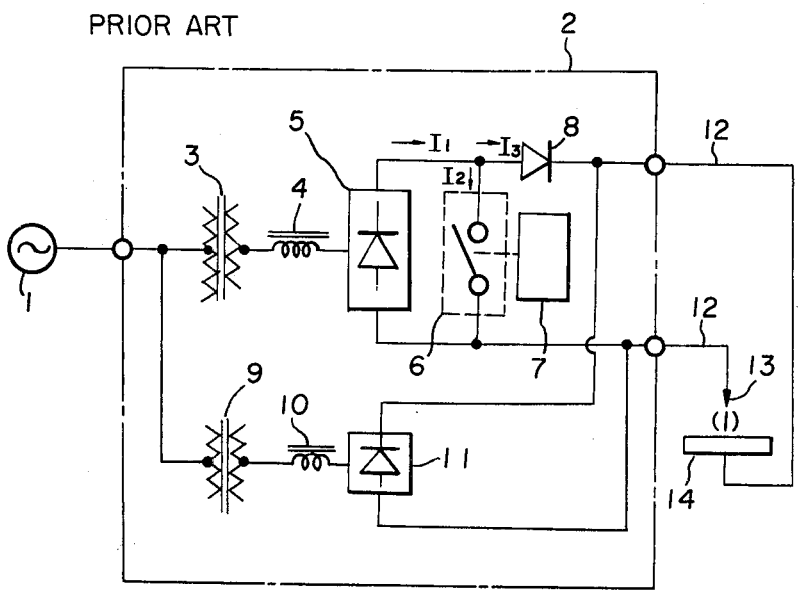
FIG. 2 is a schematic diagram of a conventional DC arc welding apparatus using high-frequency pulse current.
Figure 6:
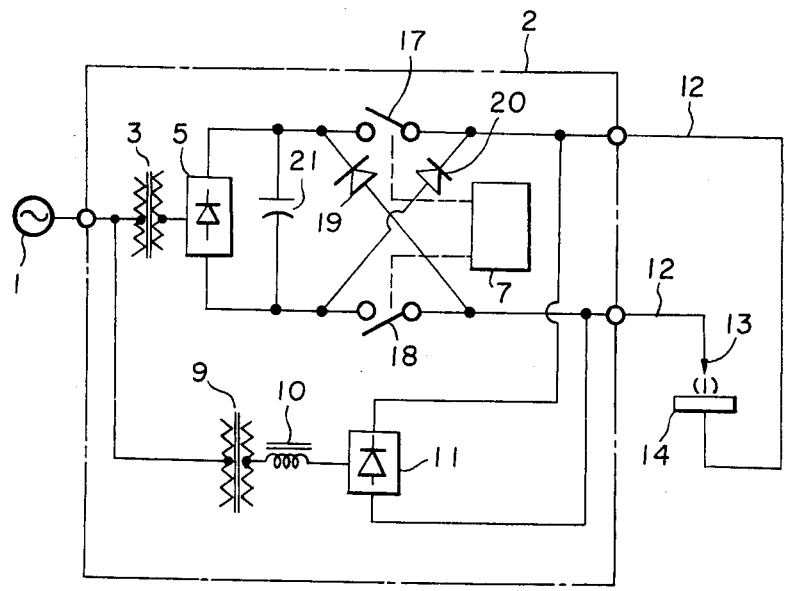
FIG. 6 is a connection diagram of one embodiment of the present invention.

FIG. 6 is a diagram of one embodiment of the invention, wherein the same references designate identical or corresponding parts to those of FIGS. 2 and 3.

The single-phase or three-phase AC power source 1 feeds the power to the main part of welding apparatus 2, which comprises a main transformer 3; a rectifier bridge 5; semiconductor switching elements 17, 18; a controlling device 7 for controlling the ON-OFF of the switching elements 17, 18; a large capacity capacitor 21 connected to the output side of the rectifier bridge 5; diode rectifiers 19, 20 for charging energy accumulated in the inductance of the circuit during the OFF state of the switching elements 17, 18 to the capacitor; an auxiliary transformer 9; an auxiliary reactor 10, and the auxiliary rectifier bridge 11.

The connection of the power source 1, the main transformer 3 and the rectifier bridge 5 and the connection of the auxiliary transformer 9, the auxiliary reactor 10, the auxiliary rectifier bridge 11 are connected with two or three cable wires in practice though they are simplified in the drawing.

A cable 12 connects the output terminal of the main part of the welding apparatus to a welding torch 13 and a workpiece for welding 14 so as to feed the welding current from the main part of the welding apparatus 2 to the arc generating part.

The rectifier bridge 5 is formed by the diode bridge circuit to rectify the AC voltage and DC voltage having a substantially smooth waveform is fed to a circuit including the electrode of the welding torch 13 and the workpiece 14.

The first switching element 17 is connected between the arc load formed between the electrode 13 and the workpiece 14 and the positive output side of the rectifier bridge 5. The second switching element 18 is connected between the arc load and the negative output side of the rectifier bridge 5. The cathode of the first rectifier i.e. the diode 19 is connected to the positive output side of the rectifier bridge 5 and the anode is connected to the output terminal of the main part of the welding apparatus 2 which is connected to the welding torch 13. The cathode of the second rectifier i.e. the diode 20 is connected to the output terminal of the main part of the welding apparatus 2 connected to the workpiece 14, and the anode is connected to the negative output side of the rectifier bridge 5.

The auxiliary transformer 9, the auxiliary reactor 10 and the auxiliary rectifier bridge 11 form an arc sustaining current feeding circuit which has the function of always feeding D.C. current needed for sustaining an arc between the electrode and the workpiece during the welding operation. The DC output side of the auxiliary rectifier bridge 11 is connected between the electrode and the workpiece.

Figure 7:
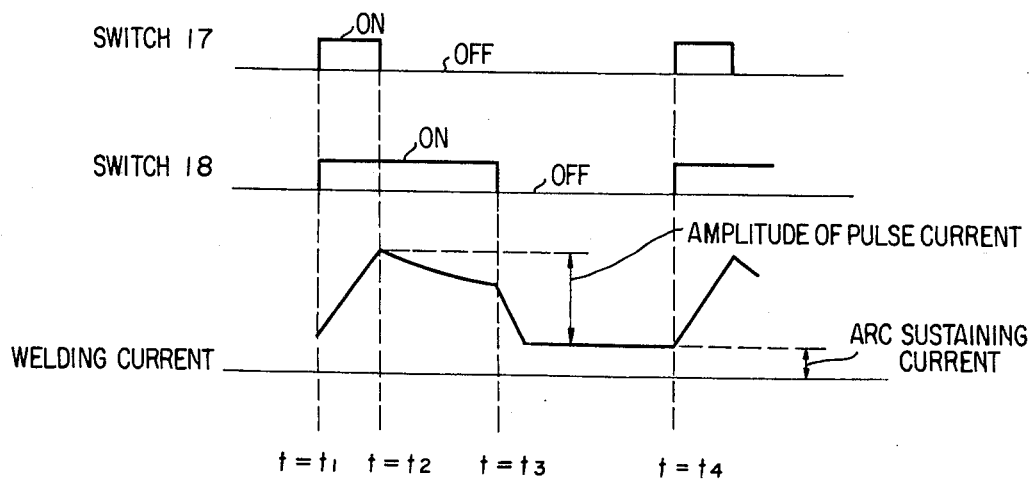
FIG. 7 shows a sequence and one of the output current waveforms of the apparatus of FIG. 6.

The operation of the apparatus will be illustrated by referring to the sequence of FIG. 7.

The switch 17 is turned on from $t_1$ to $t_2$ and the switch 18 is turned of from $t_1$ to $t_3$ by the command of the controlling device 7 as shown in FIG. 7.

The term from $t_1$ to $t_4$ is one cycle, and the same command is repeatedly given after the time $t_4$.

When the switches 17, 18 are operated, the current increase from $t_1$ to $t_2$ at a rate given depending upon the inductance of the cable 12 and is the same with the part from $t_1$ to $t_2$ of FIG. 4 by bypassing through the rectifier bridge 5, the switch 17, the cable 12, the workpiece 14, the welding torch 13, the cable 12 and the switch 18. When the switch 17 is turned off while maintaining the ON state of the switch 18 at the time $t_2$, the current of the cable 12 is gradually attenuated under a relatively long time constant by passing through a circular circuit of the cable 12, the workpiece 14, the welding torch 13, the cable 12, the switch 18 and the rectifier 20 by the same reason after the time $t_3$ in FIG. 5.

When the switch 18 is turned off at the time $t_3$ in FIG. 7, the current of the cable is passed through the cable, the workpiece 14, the welding torch 13, the cable 12, the rectifier 19, the capacitor 21 and the rectifier 20 to regenerate to the capacitor 21.

As the capacitor 21 has large capacity, it maintains a constant value depending upon the output voltage of the main transformer 3.

The attenuating rate of the current of the cable passing through said circuit, is quite faster than that of passing through the circular circuit from $t_2$ to $t_3$ because of the potential of the capacitor 21. The welding current is as shown in FIG. 7.

In accordance with the apparatus of the invention, quite high amplitude of the pulse current is given by adjusting the time $t_3$ of FIG. 7 in comparison with the conventional apparatus of FIG. 2 or FIG. 3. Moreover, the passage of the current by the inductance of the cable 12 is kept by the rectifiers 19, 20 even though the switches 17, 18 are turned off.

Accordingly, the switches 17, 18 need not use the constant-voltage diode 16 of FIG. 3 and the loss in the apparatus decreases.

However, when the apparatus of the invention of FIG. 6 is operated under the condition of shortening the cable 12 and lowering the inductance, the rate of increase or attenuation of the current is increased in substantially inverse proportion to the value of the inductance.

Figure 8:
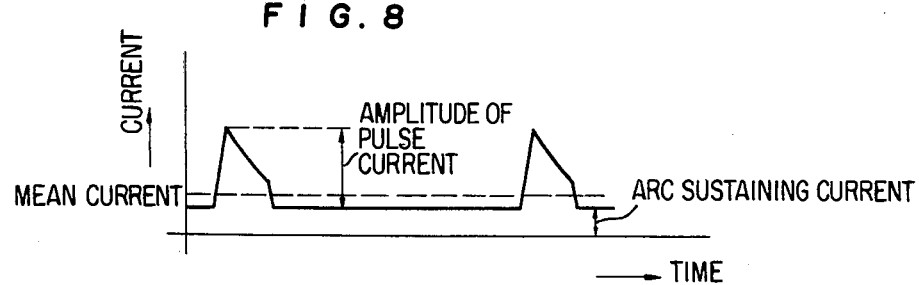
FIG. 8 shows another output current waveform of the apparatus of FIG. 6.
Figure 9:
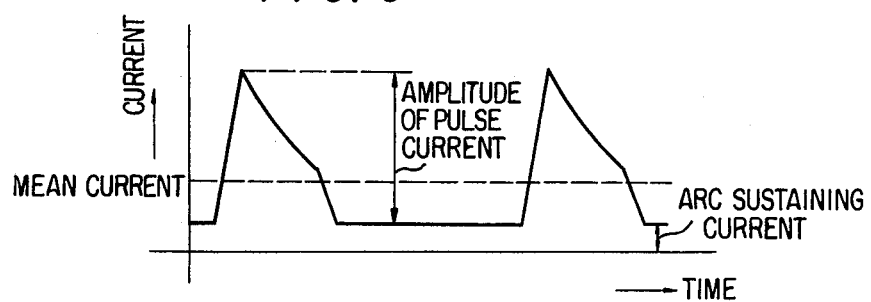
FIG. 9 shows another output current waveform of the apparatus of FIG. 6.

When the cycle of the pulse current is constant, the current waveform of FIG. 8 is given to decrease the mean value of the welding current. Accordingly, the condition of the cable is decided. When the slants of the current at various parts are decided as shown in FIG. 8 depending upon the inductance, in order to feed the current having mean value suitable for the shape and type of the workpiece to the arc generating part, it is necessary to increase peak value of the pulse current as shown in FIG. 9.

However, the peak value is limited by the allowable current of the semiconductor used for the switches 17, 18.

Figure 10:
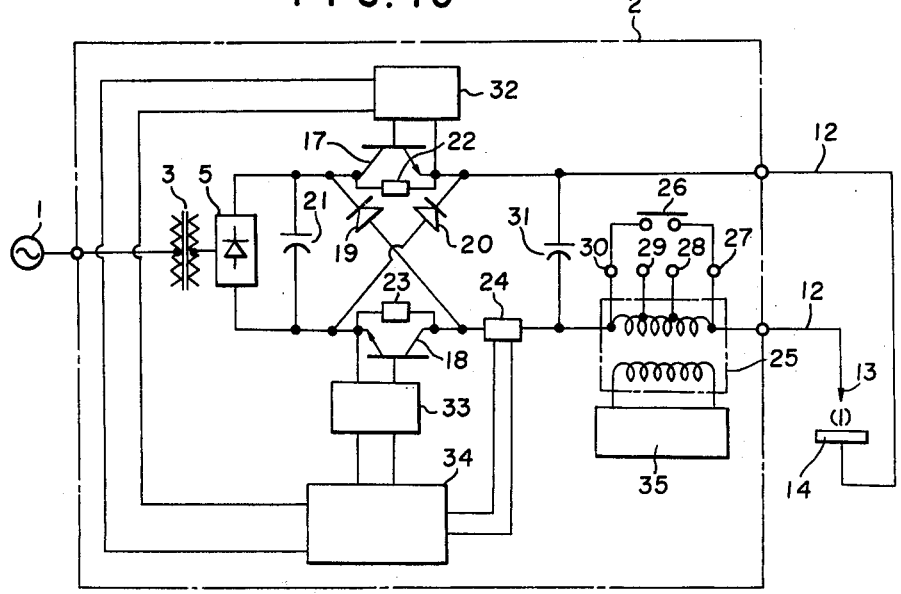
FIG. 10 is a connection diagram of the other embodiment of the invention.

Accordingly, the apparatus of FIG. 6 has disadvantages that desirable mean value cannot be obtained in the case of low inductance of the cable. FIG. 10 is a diagram of the other improved embodiment of the invention. In FIG. 10, the same references designate the identical or corresponding parts of FIG. 6.

In FIG. 10, transistors are used as the switches 17, 18 of FIG. 6. The resistors 22, 23 are connected in parallel to the transistors 17, 18 and the shunt 24 for detecting the welding current is made of an element having low resistance to feed the signal corresponding to the welding current to the controlling apparatus.

A primary winding of a coupling coil 25 is connected to the high-frequency generator 35 for starting arc and a secondary winding is connected to the output circuit of the main part of the welding apparatus as shown in FIG. 10.

A plurality of the taps 28, 29 are connected to the secondary winding of the coupling coil 25 and the terminals 27, 30 are formed at both ends of the secondary winding to connect to the both ends of the contact 26. The reference 31 designates a capacitor having small capacity and excellent high-frequency characteristics and 32 and 33 designate controlling circuits which imparts switching control of the transistors 17, 18 by the command of the controlling device 34.

The operation of the apparatus of FIG. 10 will be illustrated.

The contact 26 is turned off in the condition that the arc is not formed between the welding torch 13 and the workpiece 14 before the initiation of the welding. When the welding initiation command is given from a device (not shown) to the controlling device 34 and the high-frequency generator for arc starting 35 under said condition, the high-frequency current for arc starting is fed from the high-frequency generator 35 to the primary winding of the coupling coil 25. The high-frequency current induced in the secondary winding by said current is passed through the capacitor 31, the cable 12, the workpiece 14, the welding torch 13 and the cable 12 whereby the pilot arc is formed between the welding torch 13 and the workpiece 14.

In order to stabilize the pilot arc, a current having different value from the welding current is fed to the arc generating part for a short time by actuating the transistor 17. This is referred to as an initial current. The operation of the transistors 17, 18 at the time is substantially same with that of FIG. 7. However, during the intial current period, the contact 26 is in the OFF state, and the inductance of the secondary winding of the coupling coil 25 is found in the passage.

Accordingly, excess of the peak current of FIG. 9 is not caused.

After finishing the initial current period for less than 1 second (in usual), the arc is stabilized, and the operation of the high-frequency generator 35 is stopped and the contact 26 is turned on to short-circuit between the terminals 27, 30 of the coupling coil 25 whereby the transistors 17, 18 are actuated so as to output a welding current having a predetermined mean value after the period.

It is possible to give the optimum inductance for the operation of the apparatus by adding the inductance between the terminals 29, 30 of the coupling coil 25 to the inductance of the cable 12 by forming a short-circuit between the terminals 27, 29 by the contact 26, depending upon the inductance of the cable 12 from the viewpoint of small magnetic coupling of the coupling coil 25 because of the air-core.

In the apparatus of FIG. 10, the resistors 22, 23 are provided instead of the arc sustaining current circuit of the auxiliary transformer 9, the reactor 10 and the rectifier bridge 11 whereby the arc sustaining current is passed through the passage of the rectifier bridge 5, the resistor 22, the cable wire 12, the workpiece 14, the welding torch 13, the cable 12, the contact 26, the shunt 24 and the resistor 23 even though both of the transistors 17, 18 are in the OFF state to stop the pulse current. Accordingly, the auxiliary circuit of the auxiliary transformer 9, the reactor 10 and the rectifier bridge 11 is not necessary. In the apparatus of the invention of FIG. 10, it is possible to attain higher reliability by adding new function to the controlling device 34 together with the short-circuit operation of the coupling coil 25 so as to be applicable to broad variation of the inductance of the cable 12. The operation will be illustrated.

After finishing the initial current period, as clear from the illustration, the contact 26 is in the ON state and the high-frequency generator 35 is not actuated. The capacitor 31 has small capacity so as to form only a passage to the high-frequency current fed from the high-frequency generator 35 during the arc starting period. The resistor 22, 23 feed the arc sustaining current as stated above. The operation has been stated.

Figure 11:
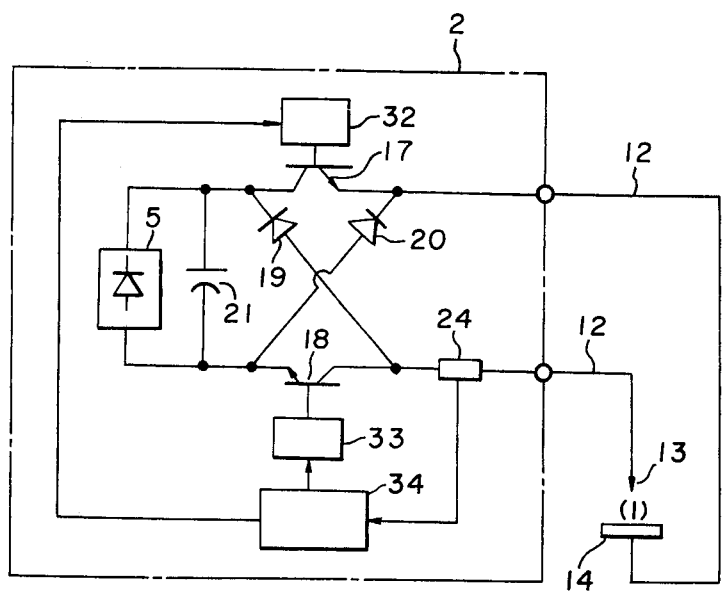
FIG. 11 is a diagram of the important part of the apparatus of FIG. 10.

Only the parts of FIG. 10 needed for illustration are shown in FIG. 11.

The controlling device 34 in FIG. 11 includes a part for detecting instantaneous value of the current by receiving the signal of the shunt 24 whereby the instantaneous values $I_{p1}$ and $I_{p2}$ are detected to control the transistors 17, 18.

Figure 12:
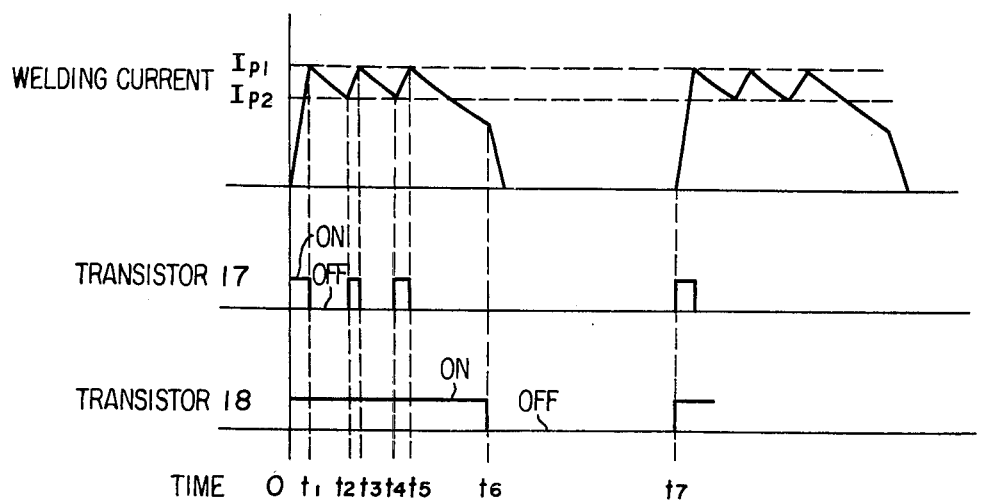
FIG. 12 shows a sequence and one of the output current waveforms of the apparatus of FIG. 10.

The controlling method will be illustrated by referring to FIG. 12 which shows the sequence of FIG. 11. In FIG. 12, when the transistors 17, 18 of FIG. 11 are turned on at the time 0 of the initiation of cycle of the pulse current, the welding current begins to increase in the same manner of FIG. 7.

The fact that the instantaneous value of the welding current reaches to $I_{p1}$ is detected by the shunt 24 and the controlling device 34 whereby the transistor 17 is turned off. The time is referred to as $t_1$.

After $t_1$, the welding current is attenuated under a relatively long time constant the same as that of FIG. 7.

When the inductance of the cable 12 is too small to reach predetermined mean value because of rapid attenuation as shown in FIG. 8, the transistor 17 is turned on again at the instantaneous value $I_{p2}$. The time is referred to as $t_2$.

After $t_2$, the circuit structure is same with that in the period $O - t_1$, whereby the current begins to increase again.

As shown after the time $t_2$ of FIG. 12, the welding current is fluctuated in the range between $I_{p1}$ and $I_{p2}$ by repeating the turn on and off of the transistor 17. When the current reaches to the predetermined mean value at the time $t_6$, both of the transistors 17, 18 are turned off whereby the current is rapidly attenuated by the reason of the case of FIG. 7. The initiation of the next cycle is referred as $t_7$. The same operation is repeated.

When the transistors 17, 18 are controlled as mentioned above, the current passed through the transistors 17, 18 does not exceed $I_{p1}$ and over-current is not passed through the transistors 17, 18 on the contrary to the case of FIG. 5, and the current having a predetermined mean value can be given in any condition of the cable.

The effect of fluctuation of the current during the period $t_1 - t_5$ to the welding operation can be negligible when the value of $I_{p2}$ is close to $I_{p1}$.

Figure 13:
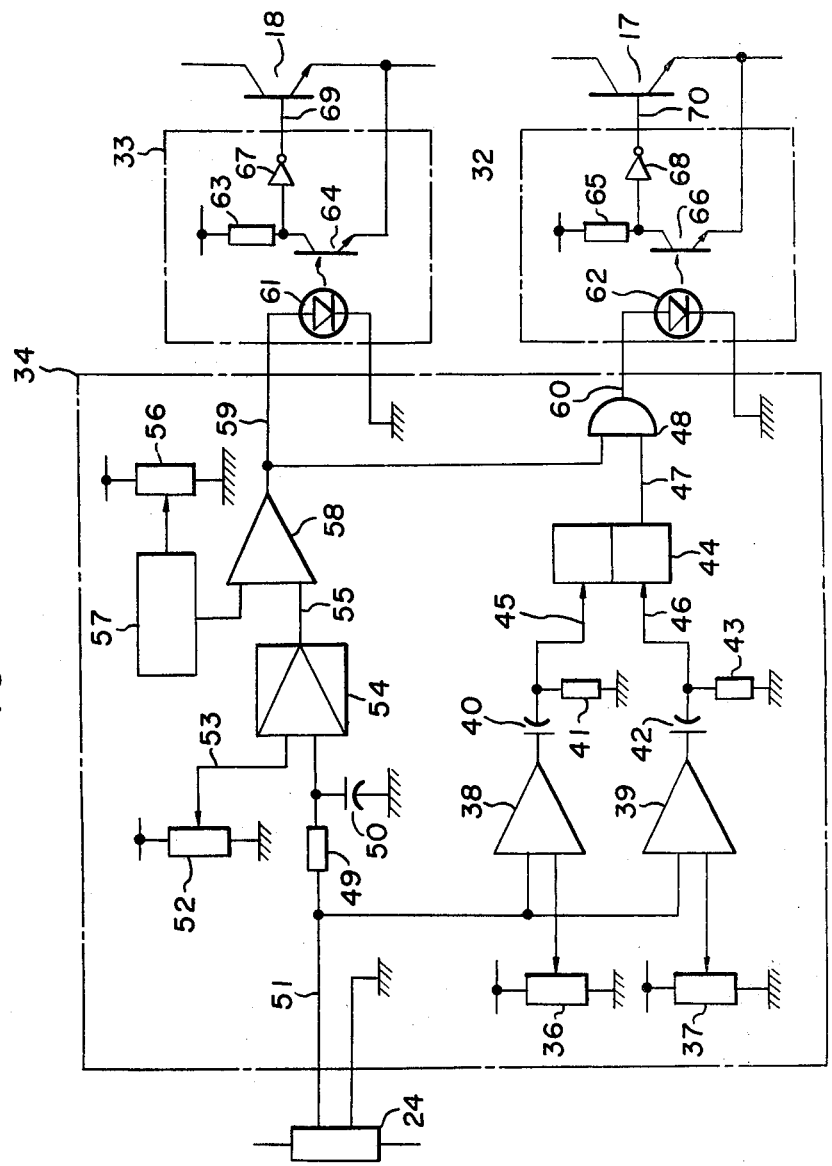
FIG. 13 is a circuit diagram of the apparatus of FIGS. 10 and 11.

FIG. 13 is a diagram of the circuit of the controlling devices 32, 33, 34 of FIG. 11 for illustrating the above-mentioned operation.

In FIG. 13, the reference 24 designates a shunt which is the same as that of FIG. 11. The signal voltage corresponding to the welding current in a signal line 51 is applied through a smoothing circuit consisting of a resistor 49 and a capacitor 50 to the inlet terminal of an error amplifier 54 and also to the inlet terminal of one of comparators 38, 39.

The references 36, 37 respectively designates variable resistors for setting $I_{p1}$ and $I_{p2}$.

Both of the sliding terminals are connected to the other input terminals of the comparators 38, 39.

The output of the comparator 38 is connected through a differential circuit consisting of a capacitor 40 and a resistor 41 to one input terminal 45 of a flip-flop circuit 44. The output of the other comparator 39 is connected through a differential circuit consisting of a capacitor 42 and a resistor 43 to the other input terminal of the flip-flop circuit 44.

The flip-flop circuit 44 is formed to output a signal 47 by applying the signal pulse to the input terminal 46 and to stop the output of signal 47 by applying the signal pulse to the other input terminal 45. The reference 48 designates an AND circuit to feed the output signal when the signals 47, 59 are combined. The reference 52 designates a variable resistor for setting the mean value of the welding current, and the sliding terminal of the resistor is connected through a signal line 53 to an error amplifier 54.

The reference 56 designates a variable resistor for setting (repeating) frequency of the pulse current and the sliding terminal is connected to the input terminal of the (repeating) frequency generator 57 which is an oscillator to output triangular waveform frequency corresponding to the output signal of the variable resistor 56 and the output is applied to one of the input terminals of a comparator 58. The other input is applied from the output terminal 55 of the error amplifier 54 to the comparator 58 and the output signal 59 of the comparator is applied to a light emission diode 61 of the controlling device 33 and also to one of the inputs of the AND circuit 60.

The output of the AND circuit 60 is applied to the light-emission diode 62 in the controlling device 32.

The reference 64 designates a phototransistor which is turned on by receiving the light from the light-emission diode 61.

The reference 63 designates a load resistance of the phototransistor 64 and 66 designates a phototransistor the same as the phototransistor 64 and is turned on by receiving the light from the light-emission diode 62; 65 designates a load resistance of the phototransistor 66 and 67 and 68 respectively designate signal inverters each of which usually includes one transistor and plural resistors to actuate the transistor 17 or 18 (same with that of FIG. 11) by receiving the output of the phototransistor 64 or 66.

The operation of the apparatus of FIG. 13 having said structure will be illustrated.

At the time period $O$ to $t_1$ of FIG. 12, the potential of the signal line 51 rises depending upon the increase of the welding current. When the potential reaches to the output voltage of the variable resistor 36 at the time $t_1$, the output of the comparator 38 is jumped. The variation is converted to the pulse by the differential circuits 40, 41 and the pulse reaches to the input terminal 45 of the flip-flop circuit 44, and the output signal 47 is stopped.

On the other hand, when the welding current decreases to reach the potential of the signal line 51 to the output voltage of the variable resistor 37, at the time in the period $t_1 - t_2$ of FIG. 12, the output of the comparator 39 actuates the flip-flop circuit 44 to generate the output signal 47. Accordingly, the output signal 47 is generated only when the potential 51 is in a range between the output voltages of the variable resistors 36 and 37 and is increasing. When the output voltages of the variable resistors 36, 37 are set to the values corresponding to the welding currents $I_{p1}$, $I_{p2}$, the output signal 47 is generated only when the welding current is in a range between $I_{p1}$ and $I_{p2}$ and is increasing. The error amplifier 54 outputs difference of the mean value of the welding current to the output of the variable resistor 52 for setting the mean value of the welding current.

When the welding current is decreased from the predetermined value, the potential of the output signal 55 increases, and when it is increased from the predetermined value, the potential of the output signal 55 is decreased.

Figure 14:
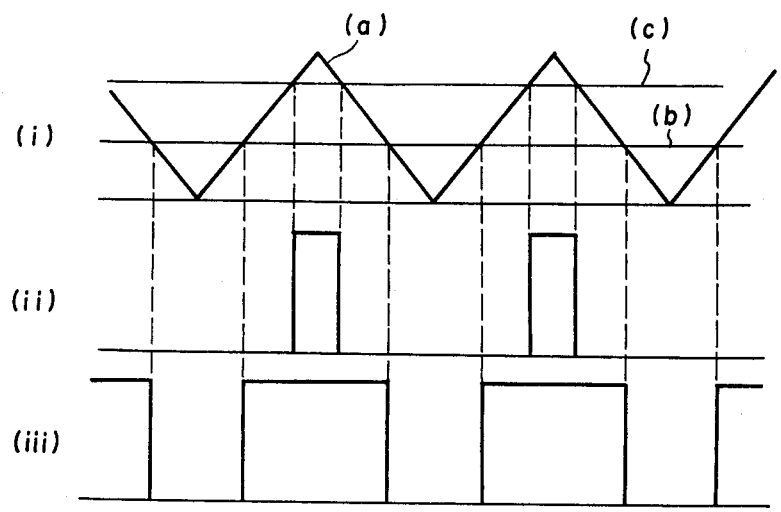
FIG. 14 is a graph for illustrating the operation of the circuit of FIG. 13.

FIG. 14 shows the relation of the input to the comparator 58 to the signal of the output 59, wherein FIG. (i) (a) shows the output of the oscillator 57, FIG. (i) (b) shows the output signal 55 found when the welding current is decreased from the predetermined value; FIG. (i) (c) shows the output signal 55 in the opposite case; FIG. (ii) shows the output signal 59 in the case of (c) of the output signal 55; FIG. (iii) shows the output signal 59 in the case of (b) of the output signal 55.

The output signal 59 is fed through the light-emission diode 61, the phototransistor 64 and the signal inverter 67 to the transistor 18 as the signal for actuating the transistor 18.

When the output signal 59 becomes high level in the cases of FIG. 14 (ii), (iii), the transistor 18 is turned on.

In said embodiment, the transistor 18 is operated as shown in FIG. 12, and the period for turning on it is varied so as to decrease the error between the value of the variable resistor 52 and the welding current, as clearly shown in FIG. 14 (ii), (iii). It is clear that the output 60 of the AND circuit 48 is the same as the signal for actuating the transistor 17 from FIG. 12, as the transistor 18 is in the ON state and the output assumes a high level in the period increasing the welding current.

Accordingly the controlling circuit 33 which receives the command controls the transistor 17 as shown in FIG. 12.

The apparatus of the invention shown in FIGS. 10 and 11, can be modified to the apparatus which gives the current waveform of FIG. 12 to the welding part, by providing the controlling device of FIG. 13.

Figure 15:
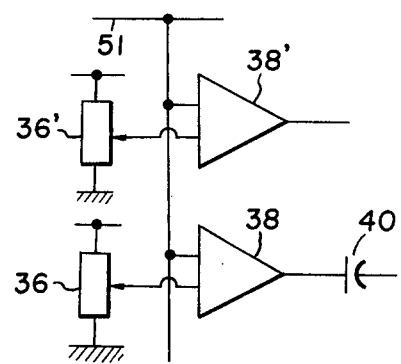
FIG. 15 is a diagram of the other important part of the apparatus of the invention.

As shown in FIG. 15, it is possible to provide an apparatus having higher reliability by adding the variable resistor 36' and the comparator 38' to the controlling apparatus of FIG. 13; and setting the output voltage of the variable resistor 36' to a voltage higher than the voltage of the variable resistor 36 in the range of the allowable peak current value; and actuating the comparator 38' to alarm or to stop the apparatus when the welding current is over $I_{p1}$ of FIG. 12 by the failure of the comparator 38.

As stated above, in accordance with the apparatus of the invention, it is possible to provide a welding apparatus which has low inner loss and enough amplitude of pulse current and high reliability and which can be applied to various cases without limitation.

We claim:

1. A DC arc welding apparatus using a high-frequency pulse current comprising:
    a rectifier bridge for commutating AC voltage and for applying DC voltage having a substantially smooth waveform to a circuit comprising an electrode and a workpiece for welding,
    a first switch connected between one side of an arc load formed between the electrode and the workpiece and a positive output side of the rectifier bridge,
    a second switch connected between the other side of the arc load and a negative output side of the rectifier bridge,
    a capacitor one end of which is connected to a contact of the rectifier bridge and the first switch and the other end of which is connected to a contact of the rectifier bridge and the second switch,
    first and second rectifiers connected so as to charge energy accumulated in the inductance of the circuit comprising the electrode and the workpiece during the OFF state of the first and second switches to the capacitor, and control means for detecting two predetermined instantaneous values of the welding current passed through the arc load and for providing ON and OFF commands to one of the switches to reciprocate the welding current for plural times in a range between the two instantaneous values during the ON state of the other switch.

2. The DC arc welding apparatus according to claim 1 wherein the first and second switches are transistors and the first and second rectifiers are diodes.

3. The DC arc welding apparatus according to claim 1, including an arc sustaining current circuit which passes a DC current having a small value for sustaining the arc between the electrode and the workpiece during operation thereof.

4. The DC arc welding apparatus according to claim 3 wherein the arc sustaining current circuit comprises an auxiliary transformer connected to an AC power source, a reactor and a rectifier bridge having a DC output terminal which is connected between the electrode and the workpiece.

5. The DC arc welding apparatus according to claim 3 wherein the arc sustaining circuit comprises at least one of a resistor and an impedance which is connected in parallel to the first switch and at least one of a resistor and an impedance which is connected in parallel to the second switch.

6. The DC arc welding apparatus according to claim 1 including a high-frequency generator, and a coupling coil having a primary winding and a secondary winding, the primary winding being connected to the high-frequency generator and the secondary winding being connected in series to the arc load.

7. The DC arc welding apparatus according to claim 6 further comprising a plurality of taps connected to the secondary winding of the coupling coil so as to vary the inductance of the secondary winding of the coupling coil.

8. The DC arc welding apparatus according to claim 1 including means for stopping the operation of the control means when an instantaneous value of the welding current over a predetermined value is detected.

* * * * *